No. 851,657. PATENTED APR. 30, 1907.
J. C. FERGUSON.
HARROW.
APPLICATION FILED FEB. 1, 1905.

Witnesses
G. R. Thomas
M. J. Miller

Inventor
J. C. Ferguson
By
Attorneys

UNITED STATES PATENT OFFICE.

JACOB C. FERGUSON, OF WILBER, NEBRASKA.

HARROW.

No. 851,657.     Specification of Letters Patent.     Patented April 30, 1907.

Application filed February 1, 1905. Serial No. 243,687.

*To all whom it may concern:*

Be it known that I, JACOB C. FERGUSON, a citizen of the United States, residing at Wilber, in the county of Saline, State of Nebraska, have invented certain new and useful Improvements in Harrows; and I do hereby declare the following to be a full, clear, and exact description of the invention, such as will enable others skilled in the art to which it appertains to make and use the same.

This invention relates to harrows, and has for its object to provide an implement of this nature which will be simple of construction and cheap of manufacture and in which the harrow teeth may be adjusted to any desired pitch.

Other objects and advantages will be apparent from the following description, and it will be understood that modifications of the specific construction shown may be made, and any suitable materials and proportions may be used for the various parts without departing from the spirit of the invention.

Figure 1:
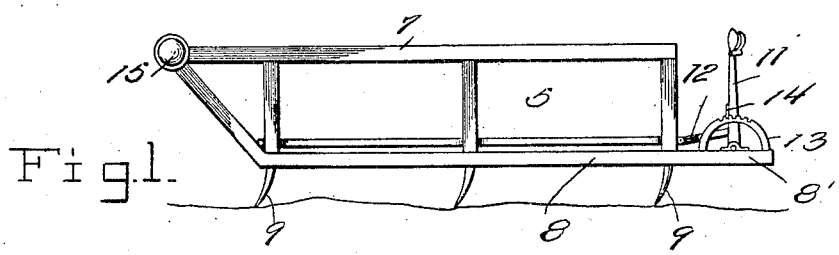
Figure 2:
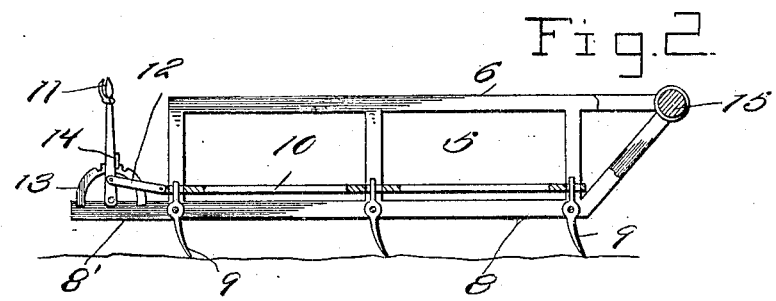
Figure 3:
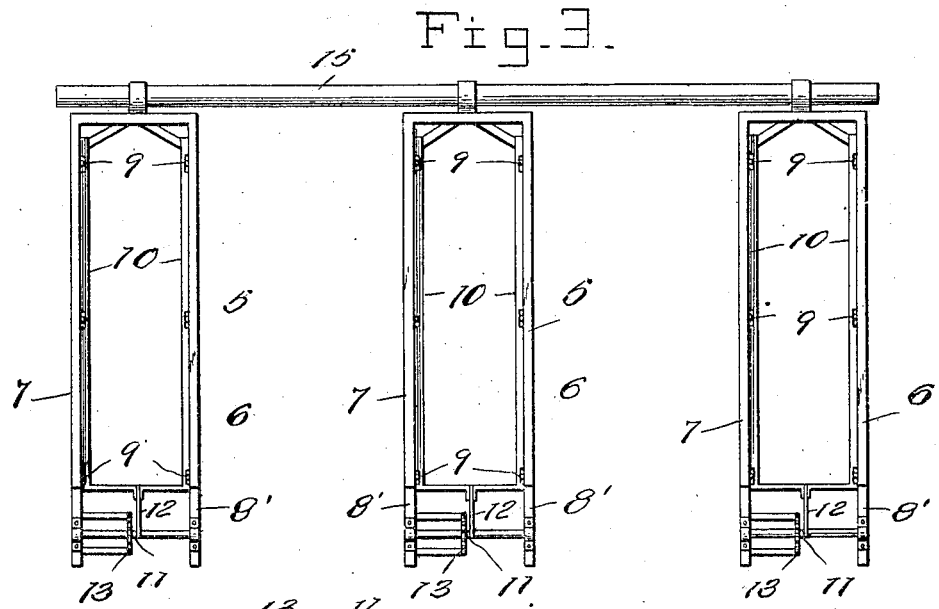
Figure 4:
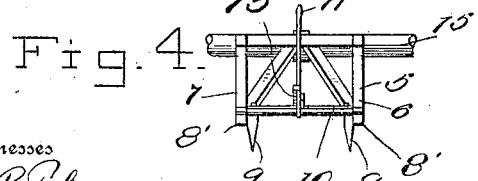

In the drawings forming a portion of this specification and in which like numerals of reference indicate similar parts in the several views, Figure 1 is a side elevation of the harrow. Fig. 2 is a vertical longitudinal sectional view through one of the harrow sections. Fig. 3 is a top plan view of the harrow, and, Fig. 4 is a rear elevation of one of the sections, only a portion of the draft-bar being shown.

Referring now to the drawings, the present invention comprises a plurality of sections which are identical so that a description of one will suffice for all. Each of these sections comprises a frame 5 including side portions 6 and 7, and at the lower edges of each of these side portions there is a rod 8 which extends rearwardly therebeyond, as shown at 8', and which has the teeth or shovels 9 of the harrow pivoted thereto at intervals throughout its length.

The teeth 9 extend upwardly above the rods 8 and are connected at their upper ends by means of shift rods 10 which are pivoted thereto and which are connected at their rearward ends to a hand lever 11 by means of links 12, this hand lever being pivoted between the rearwardly extending ends 8' of the rods 8 and being provided with a segmental rack 13 and pawl 14 to hold it at different points of its pivotal movement, and it will be understood that the pitch of the teeth 9 may be varied by moving the lever 11.

The several frames 5 are connected at their forward ends to a beam 15 and arranged for lateral movement to permit the teeth to follow irregular rows, it being understood that the frames 5 are spaced sufficiently from each other to permit the two series of teeth of each frame to lie at opposite sides of the rows of plants to be treated.

The beam 15 is arranged for attachment of horses thereto and the teeth 9 are detachable as shown, so that they may be reversed when desired and in order that different forms of teeth may be used.

What is claimed is:—

A harrow comprising a frame, the teeth 9 pivoted in the frame at each side thereof, the shift rods 10 engaged with the teeth and provided with openings for the reception of the portions of the teeth above their pivot points, the rods having portions turned inwardly toward each other at their rear ends, the link 12 pivoted between the meeting ends of the portions, the rod shaft journaled in the frame, the lever 14 for rocking the shaft, the link 12 being connected with the lever, and the segmental rack 13 for holding the lever at various points.

In testimony whereof, I affix my signature, in presence of two witnesses.

JACOB C. FERGUSON.

Witnesses:
     WILLIAM H. DAVIS,
     A. B. GROUT.